United States Patent [19]

Jang

[11] Patent Number: 4,811,580
[45] Date of Patent: Mar. 14, 1989

[54] STEERING WHEEL RELEASE LOCKING MECHANISM

[76] Inventor: Jaw J. Jang, 6 Fl., No. 36-5, Ho-Ping Rd, Pan-Chiao City, Taipei Hsien, Taiwan

[21] Appl. No.: 224,386

[22] Filed: Jul. 26, 1988

[51] Int. Cl.$^4$ ............................................. B60R 25/02
[52] U.S. Cl. ........................................ 70/218; 70/189; 180/287
[58] Field of Search ................ 70/218, 188, 189, 252, 70/237; 180/287; 74/556

[56] References Cited

U.S. PATENT DOCUMENTS

| | | | |
|---|---|---|---|
| 1,142,764 | 6/1915 | Smith | 74/556 |
| 1,284,761 | 11/1918 | Perry | 70/218 |
| 1,346,815 | 7/1920 | Fraser | 70/218 |
| 1,378,478 | 5/1921 | McMullen | 74/556 |
| 1,381,000 | 6/1921 | Mueller | 70/218 |
| 1,500,836 | 7/1924 | Mayer | 70/252 |
| 1,548,636 | 8/1925 | Schwitzer | 70/189 |
| 2,844,021 | 7/1958 | Bryant | 70/218 |
| 4,425,770 | 1/1984 | Mentani et al. | 70/252 |

FOREIGN PATENT DOCUMENTS

| | | | |
|---|---|---|---|
| 2844988 | 4/1980 | Fed. Rep. of Germany | 70/252 |
| 2426596 | 1/1980 | France | 70/252 |
| 2569147 | 2/1986 | France | 70/252 |
| 1217952 | 1/1971 | United Kingdom | 70/252 |

Primary Examiner—Lloyd A. Gall
Attorney, Agent, or Firm—Kolisch, Hartwell & Dickinson

[57] ABSTRACT

A mechanism which releases the steering wheel of an automobile from engagement with the steering shaft of the automobile and which locks the steering wheel in this position. The mechanism is composed of a substantially cylindrical block with prongs on its lower side, an actuating disk which is engageable with the prongs, a steering column with a lock housing on it. The lock housing receives a bolt which is actuated by a user key to lock in one of two tracks on the cylindrical steering block. When the bolt is placed in the lower track, the prongs are disengaged from the actuating disk. When the bolt is placed in the upper track, the prongs are engaged in the actuating disk and allow for normal steering.

1 Claim, 5 Drawing Sheets

STEERING WHEEL RELEASE LOCKING MECHANISM

BACKGROUND OF THE INVENTION

This invention relates to steering wheel locking mechanisms, and in particular relates to a mechanism which disengages the steering wheel from the steering shaft and which locks the steering wheel into this disengaged position.

Conventional steering wheel locks often use physical restraints which are exterior to the steering wheel and which have the disadvantage of being subject to forcing open. Other conventional steering wheel locks actually lock the steering wheel itself into a rigid position, thereby making the steering wheel liable to damage if forced too hard.

It is the purpose of this present invention, therefore, to mitigate and/or obviate the above-mentioned drawbacks in the manner set forth in the detailed description of the preferred embodiment.

SUMMARY OF THE INVENTION

A primary objective of this invention is to provide a steering wheel lock which allows the wheel to turn freely without being engaged with the steering shaft.

Another objective of this invention is to provide a steering wheel lock which involves no exterior physical restraint.

Further objectives and advantages of the present invention will become apparent as the following description proceeds, and the features of novelty which characterize the invention are pointed out with particularity in the claims annexed to and forming a part of this invention.

DETAILED DESCRIPTION OF THE PREFERRED EMBODIMENT

Figure 1:
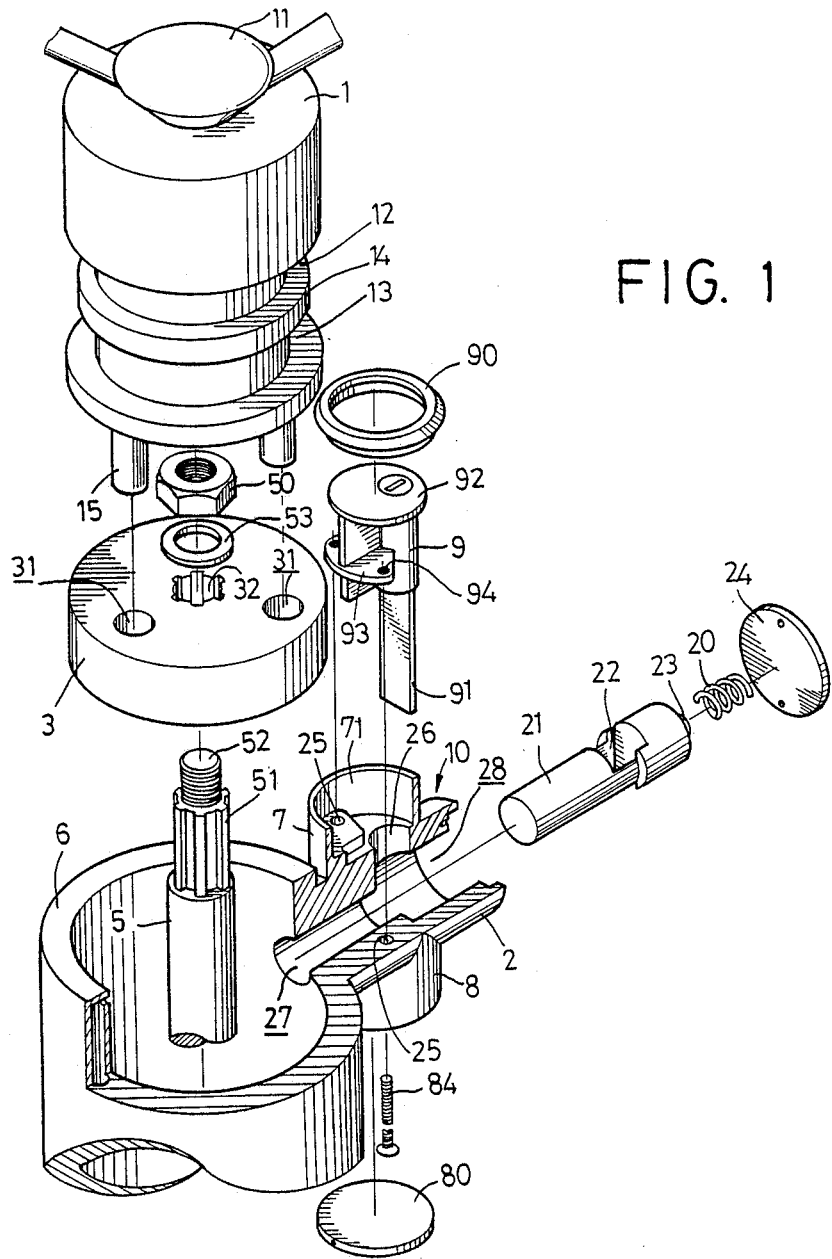
FIG. 1 is an exploded view of a steering wheel release lock accordance with the present invention.

Referring to FIG. 1, it can be seen that the steering wheel release lock of the present invention comprises the combination of a steering wheel block 1, an actuating disk 3, a steering column 6 with a lock housing 10 protruding from one end thereof and a steering shaft 5 therein, and a lock head 9 which fits in the lock housing 10.

The steering wheel block 1 is substantially cylindrical in shape and has an upper track 12 and a lower track 13 thereon. The upper and lower track 12, 13 are parallel to each other and have the same center axis as the cylindrical steering block 1. A flange 14 is set between the upper and lower track 12, 13 to separate the two tracks. A steering wheel 11 is fixed at an upper end of the steering wheel block 1. The steering wheel block 1 has a plurality of fixing prongs 15 on a lower end thereof.

Figure 2:
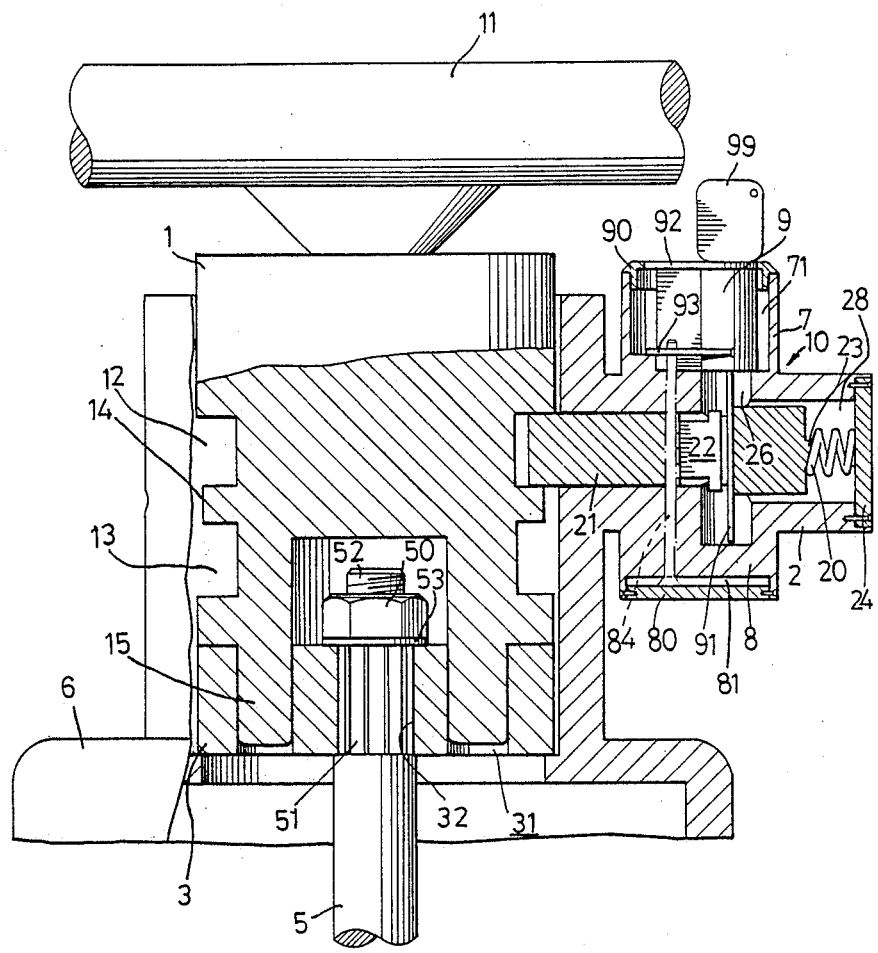
FIG. 2 is a partially cut away elevational view of the steering wheel release lock of FIG. 1 in engaged position.

Further referring to FIG. 2, it can be seen that the actuating disk 3 has a plurality of fixing holes 31 corresponding with the plurality of fixing prongs 15 for slidably receiving the fixing prongs therein. When the fixing prongs 15 are engaged in the actuating disk 3, the steering wheel release lock is in "engaged" position. In this position, turning the steering wheel 11 causes the actuating disk 3 to rotate, which in turn causes the steering shaft 5 to rotate, as will be explained more hereinbelow.

As best seen in FIG. 1, the steering shaft 5 has a plurality of vertically oriented teeth 51 on an upper end thereof for engaging with the engagement hole 32. The steering shaft 5 also has a threaded end 52 on the uppermost end thereof for engaging with a nut 50 so as to secure the actuating disk 3 to the steering shaft 5.

From FIGS. 1 and 2, it can be seen that the steering column 6 has a lock housing 10 projecting from one side thereof. The lock housing 10 comprises an upper lock seat 7, a side member 2, and a lower lock seat 8. The upper lock seat 7 has a cavity 71 at an upper end thereof which opens into an opening 26 at a lower end thereof. The opening 26 is cylindrical in shape and extends down to an upper end of the lower look seat 8. The opening 26 also communicates with a passage 27 which opens into the steering column 6. The side member 2 protrudes from a central part of the lock housing 10 and has a receptacle 28 therein for receiving a large end of a bolt 21. The side member 2 also has a side cover, plate 24 fixed at an end thereof. A spring-loaded bolt 21 has a square channel 22 extending therethrough. The cavity 71 receives and secures a lock head 9 therein. The lock head 9 has a plate 91 extending downwards therefrom into the opening 26 and channel 22. The plate 91 is turnable by a key 99 so as to move the bolt 21 laterally in the passage 27 and engage in or disengage the bolt 21 from the upper or lower track 12, 13.

Figure 3:
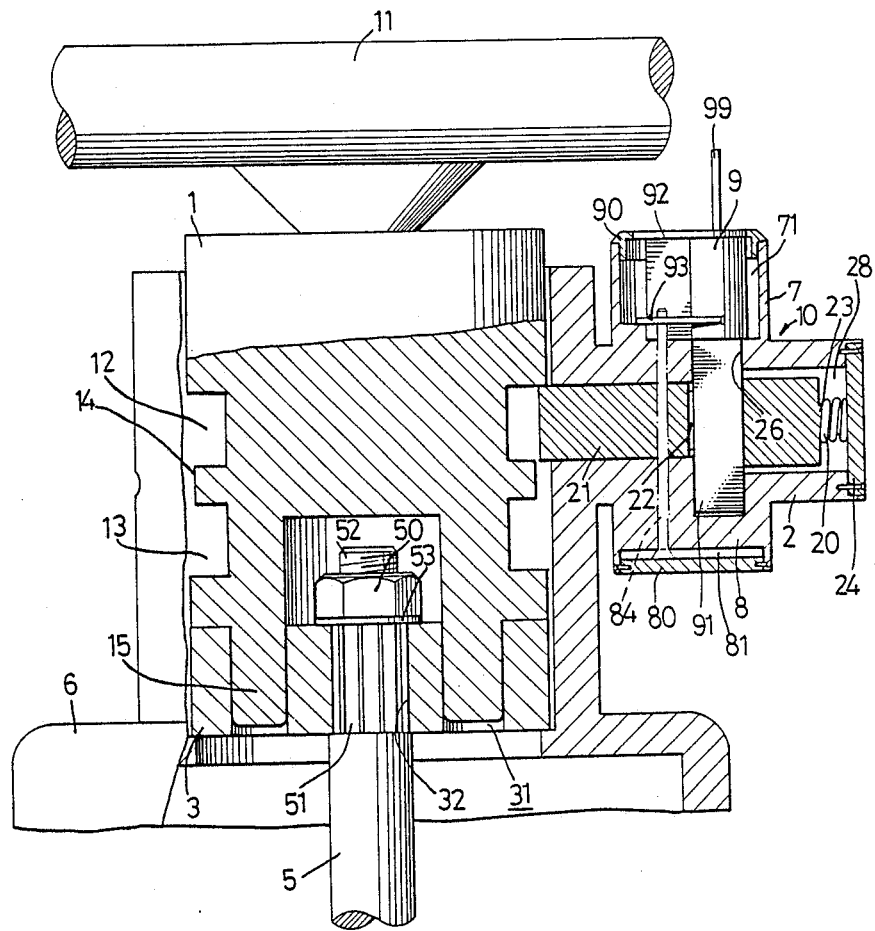
FIG. 3 is a partially cut away elevational view of the steering wheel release lock of FIG. 1 in disengaged position.
Figure 4:
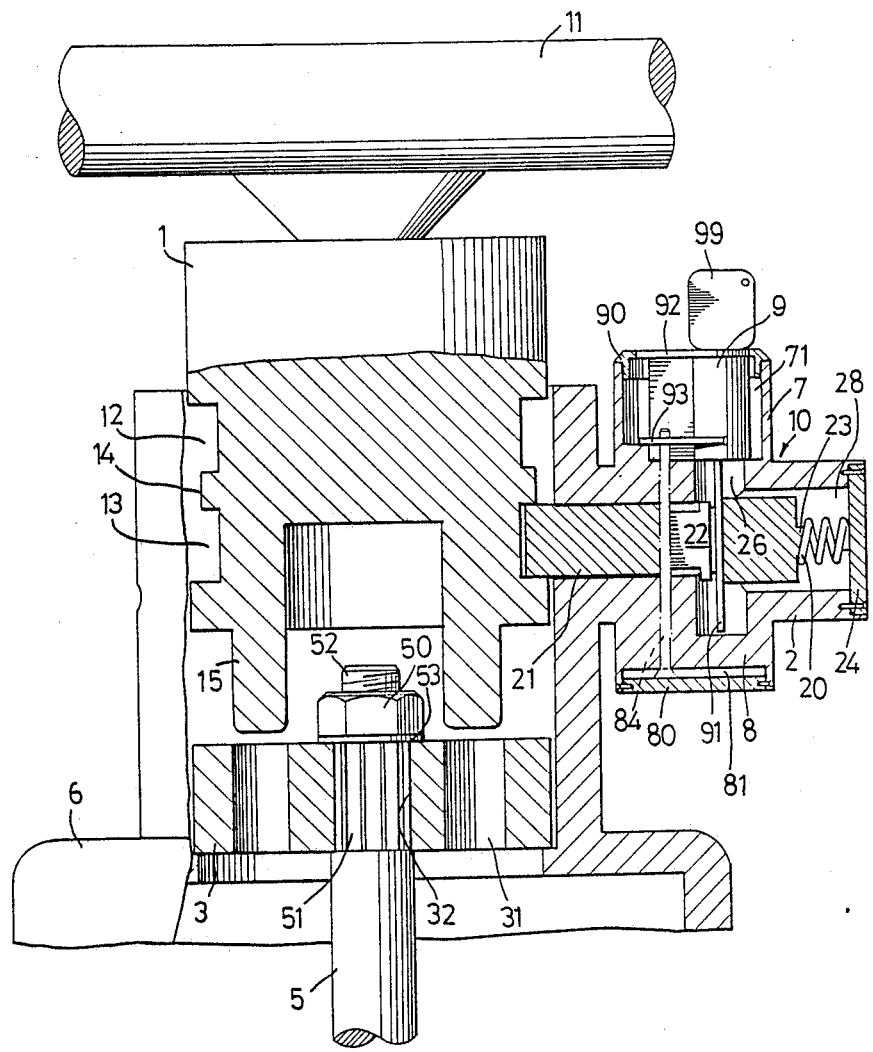
FIG. 4 is a partially cut away view of the steering wheel release lock of FIG. 1 in release lock position.

Referring to FIGS. 2, 3, and 4, the operation of the steering wheel release lock of the present invention will be described. As seen in FIG. 2, the bolt 21 is originally set in the upper track 12, so that the steering wheel release lock is in engaged position. Therefore, in this position, the steering mechanism of the automobile works in a normal manner (i.e., turning the steering wheel turns the wheel of the car). When it is desired to "lock" the steering of the automobile, the key 99 is inserted into the lock head 9, as shown in FIG. 2. Then, the key 99 is turned 90 degrees so that the bolt 21 is withdrawn from the upper track 12. This is called the "disengaged" position of the steering wheel release lock (see FIG. 3). Next, the user lifts up on the steering wheel 11 and pulls the steering block 1 upwards. When the bolt 21 contacts with the outer flange of the lower track 13, the key 99 is again turned 90 degrees, thereby causing the bolt to be fully inserted into the lower track 13, as seen in FIG. 4. Due to the flange 14 between the upper track 12 and the lower track 13, the steering block 1 can not be moved vertically, but can only be rotated. The significant point here is that although the steering wheel 11 and block 1 can be turned in this position, the fixing prongs 15 and fixing holes 31 are not engaged together. This position is called the release lock position. In release lock position, the steering shaft 5 and hence the wheels of the car can not be turned, even though the steering wheel can be turned freely. In short, the automobile is rendered undrivable unless one has the key 99 so as to change from release lock position to engaged position. Therefore, the steering wheel release lock of the present invention offers a great degree of safety without any exterior physical restraints on the steering wheel 11.

Figure 5:
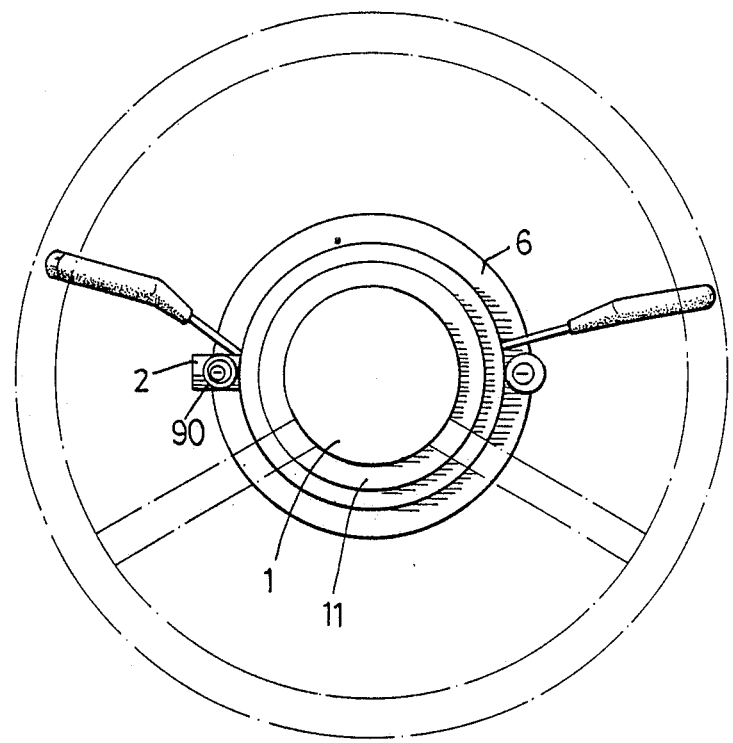
FIG. 5 is a top view of the steering wheel release lock of FIG. 1.

FIG. 5 gives the reader a better idea of how the steering wheel release lock of the present invention would look to the user when installed in an automobile.

As various possible embodiments might be made of the above invention without departing from the scope of the invention, for example, a known set of a sensor means together with an alarm device may be readily incorporated to this device for further enhancing the functionability of the invention, therefore, it is to be understood that all matter herein described or shown in the accompanying drawing is to be interpreted as illustrative and not in a limiting sense. Thus it will be appreciated that the drawings are exemplary of a preferred embodiment of the invention.

I claim:

1. A steering wheel release lock comprising the combination of:
   (a) a steering wheel block (1) being substantially cylindrical in shape and having an upper track (12) and a lower track (13) thereon; said upper and lower track (12, 13) being parallel to each other and having a same center axis as said cylindrical steering block (1); a flange (14) being set between said upper and lower track (12, 13); a steering wheel being fixed at an upper end of said steering wheel block (1); said steering wheel block (1) having a plurality of fixing prongs (15) on a lower end thereof;
   (b) an actuating disk (3) having a plurality of fixing holes (31) corresponding with said plurality of fixing prongs (15) for slidably receiving said fixing prongs therein when said steering wheel release lock is in an engaged position;
   (c) a steering shaft (5) which has a plurality of vertically oriented teeth (51) on an upper end thereof; said steering shaft (5) also having a threaded end (52) on an uppermost end thereof for engaging with a nut (50) so as to secure said actuating disk (3) to said steering shaft (5); and
   (d) a steering column (6) which has a lock housing (10) projecting from one side thereof; said lock housing (10) comprising an upper lock seat (7), a side member (2), and a lower lock seat (8); said upper lock seat (7) having a cavity (71) at an upper end thereof which opens into an opening (26) in a lower end thereof; said opening (26) being cylindrical in shape and extending down to an upper end of said lower lock seat (8); said opening (26) also communicating with a passage (27) which opens into said steering column (6); said side member (2) protruding from a central part of said lock housing (10) and having a receptacle (28) therein for receiving a large end of a bolt (21); said side member (2) also having a side cover plate (24) fixed at an end thereof; a spring-loaded bolt (21) having a square channel (22) extending therethrough; said cavity (71) receiving and securing a lock head (9) therein; said lock head (9) having a plate (91) extending downwards therefrom into said opening (26) and channel (22), said plate (91) being turnable by a key (99) so as to move said bolt (21) laterally in said passage (27) and engage said bolt (21) with said upper or lower track (12, 13); said fixing prongs (15) being engaged with said fixing holes (31) when said bolt (21) is set in said upper track (12); said fixing prongs (15) being disengaged from said fixing holes (31) when said bolt (21) is set in said lower track (13) so that turning said steering wheel (11) does not actuate said actuating disk (3) and steering shaft (5).

* * * * *